Jan. 11, 1944. P. F. BOEHM 2,339,139
REED AND METHOD OF CONSTRUCTING THE SAME
Filed March 23, 1943
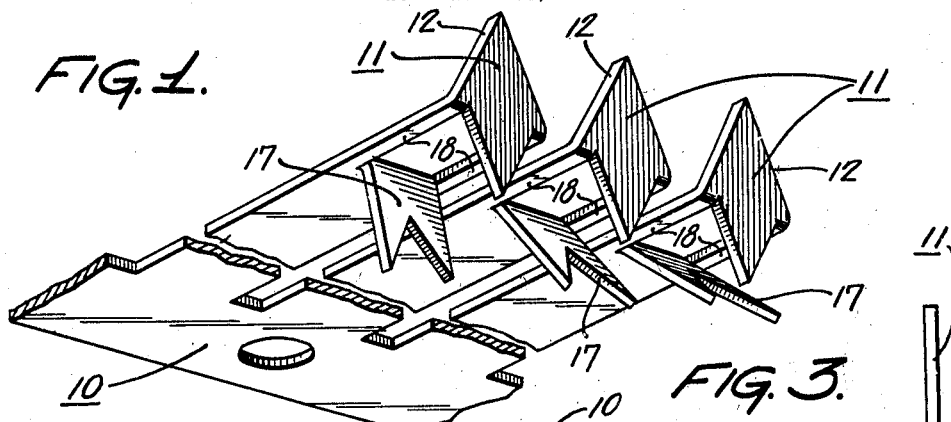
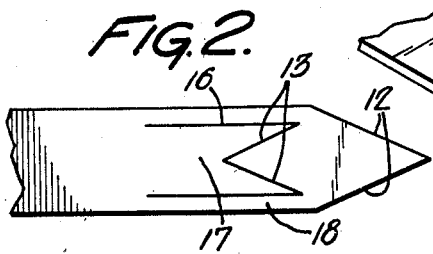
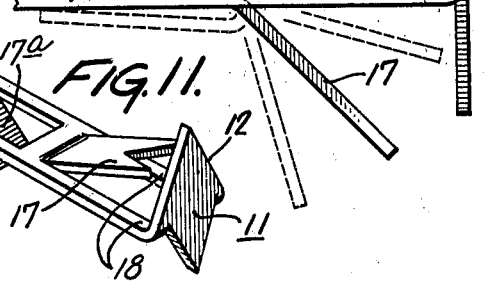
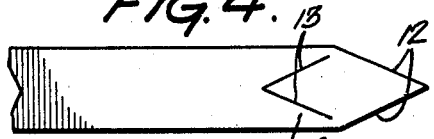
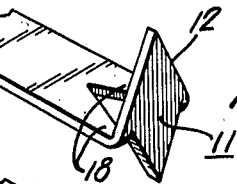
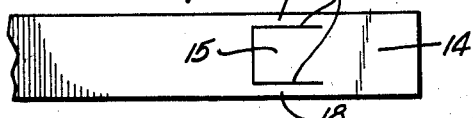
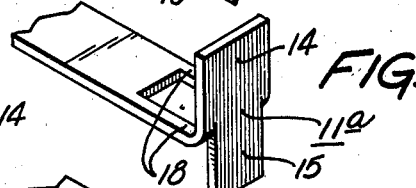
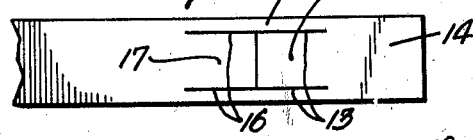
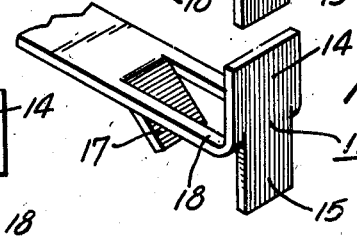
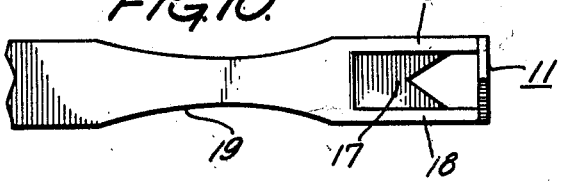
Inventor:
Paul F. Boehm
by his Attorneys
Howson & Howson Patented Jan. 11, 1944

2,339,139

UNITED STATES PATENT OFFICE 2,339,139

REED AND METHOD OF CONSTRUCTING THE SAME

Paul F. Boehm, Greenwich, Conn., assignor to James G. Biddle Company, Philadelphia, Pa., a corporation of Pennsylvania Application March 23, 1943, Serial No. 480,246

6 Claims. (Cl. 116—114)

This invention relates to a method for the construction of reeds and to reeds for vibratory instruments such as tachometers, frequency meters and the like, wherein the vibration of one or more reeds or one or more reeds of a reed bank indicate a frequency which has been impressed on the instrument.

Such instruments are usually intended for direct reading, the motion of the reeds themselves being visually noted. Since the reeds are very thin where it is necessary to employ high frequency reeds, say, for example, those having a frequency of about 800 cycles per second, observation becomes difficult. In the lower frequency ranges, the reed is of sufficient length that the movement may be readily observed by merely turning the tip of the reed over to form a reed head or by attaching a head thereto. In the minute reeds necessary in the higher resonance scale, not only is the normal over-all amplitude of the reed tip so small that observation of the swing of the tip itself is substantially impossible, but the problem of providing such a reed with a head is complicated by the fact that it is important that in such a reed there be no substantial disturbance of the distribution of mass with consequent disturbance of the reed frequency. It is furthermore extremely difficult to tune reeds of this type for the same reason.

An important object of the present invention is the provision of a method for providing, upon a vibratory reed, a head which will offer the slightest possible disturbance of the reed mass and which will additionally function to render the reed tip more highly flexible and, accordingly, susceptible to a greater vibratory movement than in the ordinary type of reed of the same frequency.

A further object of the invention is to provide a means for tuning such reeds which will again eliminate to the greatest possible extent disturbance of the reed mass and which will eliminate the application to the reed of any foreign substance for use in assisting tuning.

A still further object of the invention is the provision of a reed construction incorporating the above characteristics which will admit of the use of stamping methods.

These and other objects I attain by the construction shown in the accompanying drawing, wherein for the purpose of illustration, I have shown preferred embodiments of my invention and wherein:

Figure 1 is a fragmentary illustration of a reed bank and embodying reeds constructed in accordance with the present invention;

Figure 2 is an elevation of the tip of a reed preferred for high frequency use, the reed being shown prior to formation of the head and adjustment of the tuning element;

Figure 3 is a side elevation of the reed of Figures 1 and 2, the head being shown in its normal position and the tuning adjusting element being shown in solid lines in the position which it preferably occupies when the reed is initially formed and in dotted lines in several of the many positions in which it may be shifted for tuning;

Figure 4 is a plan view of a modified form of reed in the partially formed state;

Figure 5 is a perspective of the reed of Figure 4 in its completed state;

Figure 6 is a further form of reed in its partially completed state;

Figure 7 is a perspective of the tip of the completed reed of Figure 6;

Figure 8 is a plan view of a still further form of reed in partially completed state;

Figure 9 is a perspective of the tip of the reed in Figure 8 in completed form;

Figure 10 is a plan view of the reed tip illustrating a variation which may be incorporated in any of the reeds of Figures 1 to 9; and Figure 11 is a perspective view of a further modification of my invention.

Referring now more particularly to the drawing, the numeral 10 generally designates the reed body. This body may be either formed as shown in Figure 1 of the drawing as a portion of a unitary reed bank or may be an individual reed of the type heretofore employed in vibratory instruments of the sort under discussion. In the formation of the reed head 11, the tip of the reed is preferably transversely tapered as at 12. The reed is then slit as at 13 with an angular slit, the apex of which is directed inwardly of the reed.

The reed head is then formed by deflecting the tapered tip 12 to one side of the reed and to a plane normal to the reed, and the cusp formed by the slitting at 13 to the opposite side of the reed and to a plane normal thereto and substantially coincident with tip 12. It will be noted that in doing this, the center of mass of the material forming the head is not materially disturbed, so that the reed is not thrown out of balance to any appreciable extent, and there is very little change in its normal tuning. This type of head forming may be employed in square-tipped reeds, as shown in Figures 6 to 10, in which the rectangular terminal portion 14 of the reed and a rectangular flap 15 severed by stamping or any other suitable method are oppositely deflected to form the head 11a.

In Figures 1, 2, 3, 8, 9 and 10, I have illustrated the reeds as incorporating a means for tuning the reed without disturbing the center of mass thereof to any appreciable extent. This I accomplish by longitudinally slitting the reed as at 16, the longitudinal slits connecting with the slits 13 which free the internal tab of the reed utilized in forming the smaller side of the head. The tuning tab 17 thus freed is deflected to one side of the reed, preferably to that side at which the smaller side of the head 11 or 11a projects. In initial formation, the deflection is preferably to about 45° to the reed body. This tab in such a position serves to counterbalance any slight disturbance of the mass which may result from formation of a head, as described. The position of the tab is shifted as indicated in Figure 3, to bring the reed into proper tuning, the several reeds of a bank having their tabs 17 variously displaced as somewhat exaggeratedly illustrated in Figure 1 of the drawing. Tuning will be effected by the mass of the tab and by the varying atmospheric resistance offered in different positions. This tuning method may obviously be applied to reeds having the usual hooked and/or weighted head. Control of tuning and of the distribution of mass in the reed may be further controlled by extending the principle outlined above. An illustration of this is given in Figure 11 of the drawing wherein I have shown in addition to the tuning tab 17 just discussed, a supplemental tuning tab 17a. This tab is shown as deflected to the opposite side of the reed from the tab 17.

It will be obvious that a construction of this character will enable the production of high frequency reeds which are equipped with heads and which may be readily tuned at a very low cost, since all of the formations may be accomplished by a stamping process. The principle of construction may likewise be conveniently applied to reeds of lower frequencies. It will be noted that the severing of the tab forming the minor portion of the head produces in the reed areas of reduced cross section at 18 which increase the flexibility of the tip. When the head forming method is combined with the method of incorporating the tuning tab 17, the flexibility of the tip is even further increased. Any of the forms of the reed illustrated may have combined therein other means for increasing the flexibility of the tip, such as tapering the reed or certain portions of the reed body in thickness toward the tip or shaping the reed as indicated at 19 in Figure 10.

Since the constructions illustrated are obviously merely some of the many forms which my invention may take, I do not wish to be understood as limiting myself to the exact constructions herein illustrated except as hereinafter claimed.

I claim:

1. A vibratory reed for instruments of the type described, said reed comprising a reed body, and a head for said reed, said head comprising an angularly deflected tip of the reed and an oppositely deflected tab struck from the reed, said tip and tab being arranged in a substantially common plane substantially perpendicular to the reed body.

2. A vibratory reed for instruments of the type described, said reed comprising a reed body, and tuning means for said reed comprising a tab struck from the reed body and angularly adjustable with relation to the reed body.

3. A vibratory reed for instruments of the type described, said reed comprising a reed body, and a head for said reed, said head comprising an angularly deflected tip of the reed and an oppositely deflected tab struck from the reed, said tip and tab being arranged in a substantially common plane substantially perpendicular to the reed body, and tuning means for said reed comprising a tab struck from the reed body and angularly adjustable with relation to the reed body.

4. A vibratory reed for instruments of the type described, said reed comprising a reed body, and a head for said reed, said head comprising an angularly deflected tip of the reed and an oppositely deflected tab struck from the reed beneath said tip, said tip and tab being arranged in a substantially common plane substantially perpendicular to the reed body, and tuning means for said reed comprising a tab struck from the reed body and angularly adjustable with relation to the reed body.

5. A vibratory reed for instruments of the type described, said reed comprising a reed body, and a head for said reed, said head comprising an angularly deflected tip of the reed and an oppositely deflected tab struck from the reed, said tip and tab being arranged in a substantially common plane substantially perpendicular to the reed body, and tuning means for said reed comprising a tab struck from the reed body and angularly adjustable with relation to the reed body, said tuning tab being disposed at the same side of the reed as the first-named tab.

6. A vibratory reed for instruments of the type described, said reed comprising a reed body, a plurality of longitudinally distributed tabs struck from the reed body below the head and angularly adjustable with relation to the reed body.

PAUL F. BOEHM.